Oct. 6, 1936. S. H. COLLOM 2,056,840
FLEXIBLE CONDUIT
Filed Dec. 20, 1935
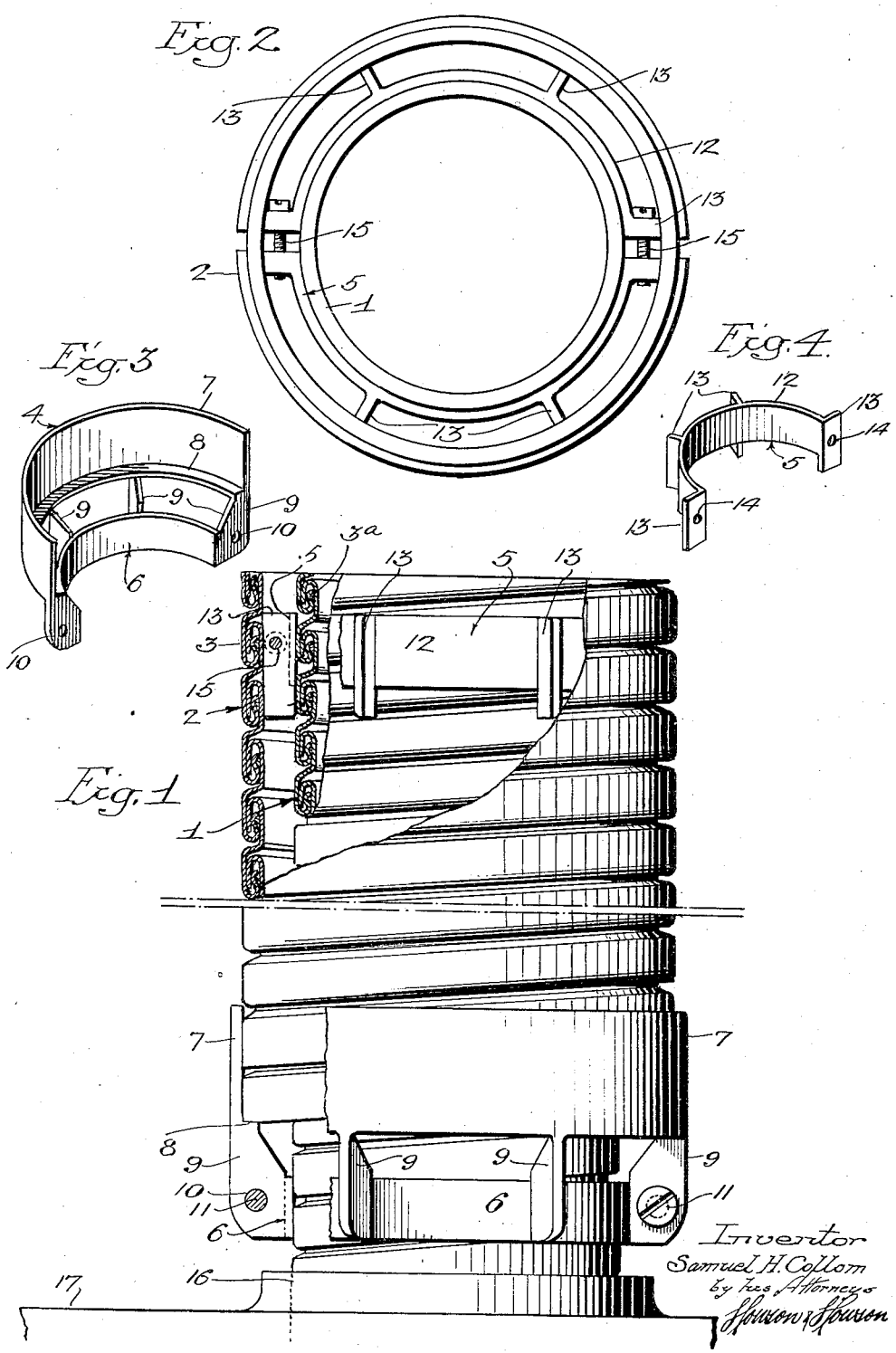
Inventor
Samuel H. Collom
by his Attorneys
Howson & Howson Patented Oct. 6, 1936

2,056,840

UNITED STATES PATENT OFFICE 2,056,840

FLEXIBLE CONDUIT

Samuel H. Collom, Philadelphia, Pa., assignor to Pennsylvania Flexible Metallic Tubing Company, Philadelphia, Pa., a corporation of Pennsylvania Application December 20, 1935, Serial No. 55,472

10 Claims. (Cl. 138—50)

This invention relates to new and useful improvements in exhaust pipes for internal combustion engines and more particularly to exhaust pipes for internal combustion engines of the Diesel type.

The principal object of the present invention is to provide a device of the character set forth including novel means for effectively cooling the same.

Another object of the invention is to provide a device of the stated character which is of rugged flexible construction and relatively inexpensive to manufacture.

Other objects of the invention and the features and details of construction thereof are set forth hereinafter and shown in the accompanying drawing; in which:

Fig. 1 is a fragmentary view in elevation of a device embodying the invention, certain portions of which have been cut away to better illustrate the construction thereof.

Fig. 2 is a view in plan of the disclosure in Fig. 1.

Fig. 3 is a view in perspective of a section of the support for one end of the cooling means; and Fig. 4 is a view in perspective of a section of the support for the other end of said cooling means.

Referring now to the drawing, Fig. 1 illustrates an exhaust pipe assembly made in accordance with the present invention and including inner and outer relatively spaced flexible metallic conduits 1 and 2 respectively constituting a pipe for the passage of exhaust gases and an overlying air channel. The flexible conduits 1 and 2 are each formed of a continuous helical winding of metal strip, ribbon or the like 3 having a substantially S-shaped cross section form so that the successive convolutions thereof may be slidably interlocked with adjacent convolutions to permit a substantial range of flexibility in the exhaust assembly, and asbestos or like packing 3a is disposed intermediate certain of said interlocking portions to tightly seal the joint between successive convolutions of the strips 3.

In the present instance the outer flexible conduit 2 constituting the air channel is supported in outwardly spaced relation coaxially with respect to the inner exhaust line 1 by means of split ring elements designated generally as 4 and 5 respectively which are disposed intermediate said conduits 1 and 2 adjacent the ends thereof as shown in Fig. 1 of the drawing.

The split ring element 4 comprises substantially semicircular sections including inner collar sections 6 arranged to cooperatively embrace the inner conduit 1 adjacent the inner or engine end thereof, and other collar sections 7 of similar arcuate length having shoulders 8 adjacent the end edge thereof, said sections 7 being arranged to cooperatively embrace the outer flexible conduit 2 with the adjacent end edge thereof engaging said shoulder 8. The sections 7 are supported in spaced relation outwardly and axially of said sections 6 by means of integral lugs or fingers 9 which extend radially between the collar sections 6 and 7 and are disposed at equally spaced intervals circumferentially of the latter. The lugs or fingers 9 at the ends of each of the collar sections 6 are provided with aligned apertures or holes 10 therein which are threaded for the reception of bolts, screws or the like 11 for connecting said sections together and tightening the same and the sections 7 circumferentially of the flexible conduits 1 and 2 respectively.

The split ring element 5 comprises substantially semicircular collar sections 12 arranged to cooperatively embrace the conduit 1 adjacent the other or outer end thereof from the engine, and these sections 12 are provided with integral lugs or fingers 13 which project radially therefrom at equally spaced intervals to engage the adjacent inner surface of the conduit 2 to support the outer end of the latter in outwardly spaced relation coaxially of the inner conduit 1, the lugs or fingers 13 at the ends of each section 12 being provided with holes 14 therein which are threaded to receive bolts, screws, or the like 15 for connecting said sections 12 together and tightening the same circumferentially of the conduit 1.

As each of the flexible metallic conduits 1 and 2 are of similar construction, the spacing between their respective walls will at all times remain substantially constant throughout the length thereof irrespective of the angle or degree of axial flexure in the assembly and it is therefore unnecessary to support the outer conduit 2 other than adjacent the extremities thereof by means of the split rings 4 and 5. The exhaust pipe assembly is operatively associated with an internal combustion engine of the Diesel or other type by suitably connecting the end thereof adjacent the split ring device 4 to the exhaust port 16 of the exhaust manifold 17 customarily provided in engines of this character. The outwardly spaced conduit 2 provides an annular channel for the passage or flow of air therethrough in either direction to effectively cool the pipe or conduit 1 through which pass the hot exhaust gases from the engine and the spaces provided between the lugs or fingers 9 and 13 respectively afford openings for the ingress and egress of air through the space or channel between said conduits.

In the present instance the outer conduit 2 is of slightly less length than the inner conduit 1 and when the outer end edges thereof are disposed in substantially the same plane as shown in Fig. 1 of the drawing, the inner end of said outer conduit 2 will reside axially inward of the other end of said inner conduit so that when the latter is connected to the exhaust manifold 17, the adjacent end of the former will be disposed in relatively spaced relation with respect to said manifold so that air for passage and circulation through the space between the walls of said conduits may freely enter the same.

While the invention has been specifically illustrated and described as an exhaust assembly for internal combustion engines of the Diesel type, it will be obvious that the same may be otherwise employed without departing from the spirit of the invention and although a particular embodiment of said invention has been set forth for descriptive purposes it is not intended that the same shall be precisely limited thereto but that modifications and changes in the details of construction thereof may be incorporated within the scope of the annexed claims.

What I claim:

1. In a device of the character described, the combination with inner and outer flexible tubular members, of means embracing each of said tubular members adjacent one end thereof to support the same in relatively spaced co-axial relation, and means embracing said inner tubular member adjacent the opposite end thereof for supporting said outer tubular member in co-axial spaced relation with respect to the former, each of said means having openings therein communicating with the space between the inner and outer tubular members.

2. In a device of the character described, the combination with inner and outer flexible tubular members, of means for supporting one end of the latter in co-axial spaced relation with respect to the former including relatively spaced collar sections arranged to respectively embrace said inner and outer tubular members, and means for supporting the other end of the outer tubular member in co-axial spaced relation with respect to the inner member including collar sections arranged to embrace the latter, said sections having integral webs projecting therefrom at substantially equally spaced intervals and arranged to engage the adjacent inner wall surface of said outer tubular member.

3. In a device of the character described, the combination with inner and outer flexible tubular members, of means for supporting one end of the latter in coaxially spaced relation with respect to the former including relatively spaced collar sections connected by integral webs disposed at equally spaced intervals therebetween, certain of said collar sections having a shoulder and embracing said outer tubular member with said shoulder engaging the adjacent end edge thereof and other of said collar sections embracing said inner tubular member, and means for supporting the other end of the outer tubular member in coaxially spaced relation with respect to the inner member including collar sections embracing the latter, said sections having integral webs disposed at substantially equally spaced intervals thereof arranged to engage the adjacent inner wall surface of said outer tubular member.

4. In a device of the character described, the combination with inner and outer flexible tubular members, of means for supporting one end of the latter in coaxially spaced relation with respect to the former including relatively spaced substantially semi-circular collar sections connected by integral webs disposed at equally spaced intervals therebetween, certain of said collar sections having a shoulder and embracing said outer tubular member with said shoulder engaging the adjacent end edge thereof and other of said collar sections embracing said inner tubular member, and means for supporting the other end of the outer tubular member in coaxially spaced relation with respect to the inner member including substantially semi-circular collar sections embracing the latter, said sections having integral webs disposed at substantially equally spaced intervals thereof arranged to engage the adjacent inner wall surface of said outer tubular member.

5. In a device of the character described, the combination with inner and outer flexible tubular members, of means respectively engaging opposite end portions of said tubular members to support the latter in spaced concentric relation, each of said means including radially extending elements arranged in spaced relation with respect to each other to provide openings for the relatively free passage of air to and from the space between the tubular members intermediate the supporting means.

6. In a device of the character described, the combination with inner and outer flexible tubular members, of means for supporting at least one end of the latter in co-axial spaced relation with respect to the former including relatively spaced collar sections arranged to respectively embrace said inner and outer tubular members, said relatively spaced collar sections being connected by integral webs extending therebetween in openly spaced relation with respect to each other to provide openings for the relatively free circulation of air through the space between the tubular members.

7. In a device of the character described, the combination with inner and outer flexible tubular members, of means for supporting at least one end of the latter in coaxially spaced relation with respect to the former including relatively spaced substantially semi-circular collar sections connected by integral webs disposed therebetween in openly spaced relation with respect to each other to provide openings for the relatively free circulation of air through the space between the tubular members, certain of said collar sections having a shoulder and embracing said outer tubular member with said shoulder engaging the adjacent end edge thereof and other of said collar sections embracing said inner tubular member.

8. In a device of the character described, the combination with inner and outer flexible tubular members, of means for supporting the outer tubular member in coaxially spaced relation with respect to the inner member including collar sections arranged to embrace the latter, said sections having integral webs projecting therefrom at substantially equally spaced intervals and arranged to engage the adjacent inner wall surface of said outer tubular member.

9. In a device of the character described, the combination with inner and outer flexible tubular members, of means for supporting the outer tubular member in coaxially spaced relation with respect to the inner member including substantially semi-circular collar sections arranged to embrace the latter, said sections having integral webs projecting therefrom at substantially equally spaced intervals and arranged to engage the adjacent inner wall surface of said outer tubular member.

10. In a device of the character described, the combination with inner and outer tubular members, of means respectively engaging opposite end portions of said tubular members to support the latter in spaced concentric relation, each of said means including elements arranged in openly spaced relation with respect to each other to provide openings for the relatively free circulation of air through the space between the tubular members.

SAMUEL H. COLLOM.